US011335299B2

(12) United States Patent
Estelle et al.

(10) Patent No.: US 11,335,299 B2
(45) Date of Patent: May 17, 2022

(54) TONAL PALETTE GENERATION

(71) Applicant: Google LLC, Mountain View, CA (US)

(72) Inventors: Joshua J. Estelle, Mountain View, CA (US); Rachel Lara Been, Mountain View, CA (US); Cristobal Chao Gersol, Mountain View, CA (US)

(73) Assignee: Google LLC, Mountain View, CA (US)

( * ) Notice: Subject to any disclaimer, the term of this patent is extended or adjusted under 35 U.S.C. 154(b) by 481 days.

(21) Appl. No.: 16/341,264

(22) PCT Filed: Dec. 20, 2017

(86) PCT No.: PCT/US2017/067725
§ 371 (c)(1),
(2) Date: Apr. 11, 2019

(87) PCT Pub. No.: WO2019/125448
PCT Pub. Date: Jun. 27, 2019

(65) Prior Publication Data
US 2021/0335319 A1 Oct. 28, 2021

(51) Int. Cl.
G09G 5/02 (2006.01)
G09G 5/06 (2006.01)
G06T 11/00 (2006.01)
H04N 1/64 (2006.01)
H04N 1/60 (2006.01)

(52) U.S. Cl.
CPC .......... G09G 5/06 (2013.01); G09G 2340/06 (2013.01)

(58) Field of Classification Search
CPC combination set(s) only.
See application file for complete search history.

(56) References Cited

U.S. PATENT DOCUMENTS 5,398,120 A    3/1995  Friedman et al.
7,180,524 B1 * 2/2007  Axelrod ................. G09G 5/02
                                              345/593
(Continued)

FOREIGN PATENT DOCUMENTS

CN        106464869        2/2017

(Continued)

OTHER PUBLICATIONS

CN Office Action in Chinese Application No. 201780072287.0, dated Jan. 19, 2021, 10 pages (with English translation).

(Continued)

Primary Examiner — Wesner Sajous
(74) Attorney, Agent, or Firm — Fish & Richardson P.C.

(57) ABSTRACT

Methods, systems, and apparatus, including computer programs encoded on a computer storage medium, for receiving, by a palette generation module of a computing system, an input color value that represents an input color. The module identifies a first palette from a plurality of reference palettes that each include a set of colors. The first palette is identified using the input color. In response to identifying the first palette, the module selects a particular color of the first palette based on a minimum computed distance between the input color and the colors of the first palette. The module generates a second palette that includes a second set of colors. The second palette is generated by interpolating the first color palette based on the minimum computed distance used to select the particular color of the first palette.

23 Claims, 6 Drawing Sheets

(56) References Cited

U.S. PATENT DOCUMENTS

| | | | |
|---|---|---|---|
| 9,401,032 B1 | 7/2016 | Dorner et al. | |
| 2006/0132872 A1* | 6/2006 | Beretta | H04N 1/62 358/518 |
| 2008/0123144 A1* | 5/2008 | Kress | H04N 1/56 358/3.01 |
| 2014/0111539 A1* | 4/2014 | Allen | G06T 11/001 345/594 |
| 2014/0268258 A1* | 9/2014 | Cuciurean-Zapan | H04N 1/00045 358/504 |
| 2015/0009226 A1* | 1/2015 | Minagawa | G06K 9/3216 345/593 |
| 2015/0242099 A1* | 8/2015 | Wallace | G06T 11/001 345/594 |
| 2017/0287171 A1* | 10/2017 | Grams | G06T 11/001 |
| 2018/0052057 A1* | 2/2018 | Richards | G01J 5/025 |
| 2018/0322661 A1* | 11/2018 | Shugrina | G06F 3/04883 |

OTHER PUBLICATIONS

EP Office Action in European Appln. No. 17829858.4, dated Mar. 29, 2021, 6 pages.

CN Office Action in Chinese Application No. 201780072287.0, dated Jul. 24, 2020, 19 pages (with English translation).

PCT International Preliminary Report on Patentability in International Application No. PCT/US2017/067725, dated Jun. 23, 2020, 8 pages.

PCT International Search Report and Written Opinion in International Application No. PCT/US2017/067725, dated Sep. 7, 2018, 14 pages.

* cited by examiner

```
getClosestGoldenPalette(inputColor) {
    distance = Infinity;
    for (i = 0; i < goldenPalettes.length; i++) { // Traverses the golden palettes
        for (j = 0; j < goldenPalettes [i] .length; j++) { // Traverses all the shades
            goldenPaletteColor = goldenPalettes [i] [j];
            distanceColors = getDistanceFromColors(
                inputColor.lab()
                goldenPaletteColor.lab()
            );
            if (distanceColors < distance) {
                distance = distanceColors;
                closestGoldenpalette = {
                    goldenPaletteColors: goldenPalettes [i],
                    shadeIndex: j
                }
            }
        }
    }
    return closestGoldenPalette;
}
```

TONAL PALETTE GENERATION

CROSS-REFERENCE TO RELATED APPLICATION

This application is a National Stage Application under 35 U.S.C. § 371 and claims the benefit of International Application No. PCT/US2017/067725, filed Dec. 20, 2017. The disclosure of the foregoing application is hereby incorporated by reference in its entirety.

BACKGROUND

This specification relates to computing processes for generating a tonal palette.

Computer systems are generally configured to produce a variety of different colors, where distinct colors can be shown to have a variety of different shades and tones. The colors can be generated using different color spaces that correspond to certain color models. Each color model can be represented using mathematical relationships for defining the corresponding color space. For example, a red green blue (RGB) color space, created by the International Commission on Illumination (CIE), is defined using mathematical models described in specifications produced by the CIE. Hence, a color model may be a mathematical model describing ways in which colors can be represented as tuples of numbers or color values (e.g., triples in RGB or quadruples in other models). In general, color spaces define quantitative links between distributions of wavelengths in the visible electromagnetic spectrum and indicate perceivable colors in the human color vision. Mathematical relationships that define color spaces provide tools for color management and for producing illuminated displays of various electronic devices. Conventional methods of designing a color palette that have certain visual properties, such as meeting accessibility standards while also including a predetermined color, such as a brand color desired for the color palette to meet a corporate identity guideline, present a laborious task. For example, this task often has to be repeated for each different color palette and predetermined color and requires significant expertise by human-computer interface experts and user interface designers.

SUMMARY

Methods, systems, and apparatus, including computer programs encoded on a computer storage medium, for receiving, by a palette generation module of a computing system, an input color value that represents an input color. The module identifies a first palette from a plurality of reference palettes that each include a set of colors. The first palette is identified using the input color. In response to identifying the first palette, the module selects a particular color of the first palette based on a minimum computed distance between the input color and the colors of the first palette. The module generates a second palette that includes a second set of colors. The second palette is generated by interpolating the first color palette based on the minimum computed distance used to select the particular color of the first palette.

One aspect of the subject matter described in this specification can be embodied in a computer-implemented method. The method includes, receiving, by a palette generation module of a computing system, an input color value that represents an input color; identifying, by the palette generation module, a first palette from a plurality of reference palettes that each include a set of colors, the first palette being identified using the input color; in response to identifying the first palette, selecting, by the palette generation module, a particular color of the first palette based on a minimum computed distance between the input color and the colors of the first palette; and generating, by the palette generation module, a second palette that includes a second set of colors, wherein the second palette is generated by interpolating the second palette based on the minimum computed distance used to select the particular color of the first palette.

These and other implementations can each optionally include one or more of the following features. For example, in some implementations, generating the second palette includes: determining the minimum computed distance as a distance value between the input color and the particular color of the first palette; interpolating colors of the second palette by using the distance value to compute a respective offset value for each color of the first palette; generating a plurality of different color variations of the input color by applying the respective offset value to a color value for each color of the first palette; and generating the second palette using the plurality of different color variations of the input color, where the plurality of different color variations corresponds to the second set of colors.

In some implementations, each color of the first palette is represented by at least one parameter for a dimension of a multi-dimensional LAB color space. In some implementations, generating the second palette includes: computing an interpolation of the first color palette as a vector operation for each dimension of the multi-dimensional LAB color space; and generating the second palette based on the computed interpolation. In some implementations, computing the interpolation of the first color palette includes: computing a match interpolation of the first color palette. In some implementations, computing the interpolation of the first color palette includes: computing a linear interpolation of the first color palette.

In some implementations, identifying the first palette includes: computing, for a LAB color space, a distance from the input color to each color included in each of the plurality of reference palettes; based on the computed distance, determining a minimum distance from the input color to each of the plurality of reference palettes; and using the minimum distance, identifying the first palette from the plurality of reference palettes as a palette that is closest to the input color. In some implementations, the distance from the input color to each color included in each of the plurality of reference palettes is computed based on a CIEDE2000 metric. In some implementations, selecting the particular color of the first palette includes generating a shade index including color shade variations for the particular color of the first palette.

Another aspect of the subject matter described in this specification can be embodied in a computer-implemented method for generating a tonal palette including a plurality of colors. The method includes, obtaining an input color; determining from a plurality of predetermined reference palettes a reference palette closest to the input color; determining a minimum color distance between the input color and the colors included in the closest reference palette; and generating a new tonal palette from the reference palette by interpolating the new tonal palette based on the reference palette and the minimum color distance. The effect and advantage of the generating step is that the new tonal palette includes at least one color close, or identical, to the input color. Furthermore, the new palette has visual properties that are close to, or the same as, the reference palette visual properties, including for example, the contrast between colors, such that the contrast between pairs of colors in the new palette is close to the contrast among corresponding colors in the reference palette. In that manner, accessibility standards met by the reference palette are also met by the new palette. Alternatively, or in addition, if colors in the reference color palette are visually distinct to a person with color blindness, such as red-green blindness, so are the colors included in the new palette.

These and other implementations can each optionally include one or more of the following features. For example, in some implementations, the closest reference palette is determined from the plurality of predetermined reference palettes as a reference palette that includes a color with minimum color distance to the input color. This provides technical detail of the step of determining the reference palette "closest" to the input color. In some implementations, wherein color distance is determined based on CIEDE2000 metric. This specifies an implementation option that can result in "best" visual results. In some implementations, wherein colors for comparison are converted to LAB color space before determining color distance.

In some implementations, wherein the interpolation is computed as a vector operation in LAB color space. This specifies another implementation option that can result in "best" visual results. In some implementations, the interpolation is a linear interpolation based on a lightest to a darkest color in the palette. This provides an implementation detail related to a simplified model of computing the interpolation. In some implementations, the interpolation is a match interpolation, wherein each color in the new tonal palette is interpolated from a corresponding color in the reference palette and the minimum color distance. This provides an implementation detail that can result in an improved model of computing the interpolation, which leads to an improved visual appearance. In some implementations, the interpolation is such that the input color is included in the new tonal palette. This specifies a further detail of the interpolation, where a technical effect is that a specific color, e.g. brand color, can be included in the new tonal palette.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. New tonal palettes can be of multiple tones/colors/shades are automatically generated by a computing process using a single input color and a reference palette, whereas the creation of new tonal palettes was previously performed through a manual subjective process which was not repeatable, and could not be automated. The techniques described herein enable a repeatable automated process that does not require human intervention or subjective color/tone adjustment. As such, the techniques discussed herein enable a computer or computing system to perform operations that the computer was previously unable to perform due to the subjective nature of tonal palette creation.

A computing process includes receiving a value for an input color and using the input color to produce a tonal palette that has harmonious color shades which are based on visual properties of a curated set of reference palettes. A computer system executes the process by identifying and selecting a reference palette that has color tones which substantially match the input color. The system uses mathematical relationships between the input color and the reference palette to generate a new tonal palette. The system uses a specific set of computational rules to consistently and efficiently generate new tonal palettes based on curated properties of the reference palettes. Using specific computing rules, the system generates a tonal palette with colors and shades that work harmoniously with each other. The computing rules ensure that color usage in a generated palette meets accessibility standards and includes sufficient contrast between shade elements of the palette.

Technical effects and advantages of this specific computing process is that a new tonal palette can include at least one color that is close, or identical, to the input color. Furthermore, the new palette can have visual properties that are close to, or the same as, visual properties of the reference palette. Visual properties can include, for example, the contrast between colors of a palette, where the process ensures that the contrast between pairs of colors in the new palette is close to the contrast among corresponding colors in the reference palette. In this manner, accessibility standards met by the reference palette are also met by the new palette. Alternatively, or in addition, if colors in the reference palette are visually distinct to a person with color blindness, such as red-green blindness, then the colors included in the new palette will be also distinct to these persons, such that a person with color blindness will be able to distinguish between the different colors of the new tonal palette, thereby providing an additional advantage and technical effect. Alternatively, or in addition, if colors in the reference palettes are visually distinct and displayed with sufficient contrast across different display devices, which differ in practice in their abilities to display individual colors, then the colors included in the new generated palette will also be visually distinct and displayed with sufficient contrast across these different display devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B shows an example function routine for obtaining a reference palette from multiple reference palettes.

DETAILED DESCRIPTION

Figure 1:
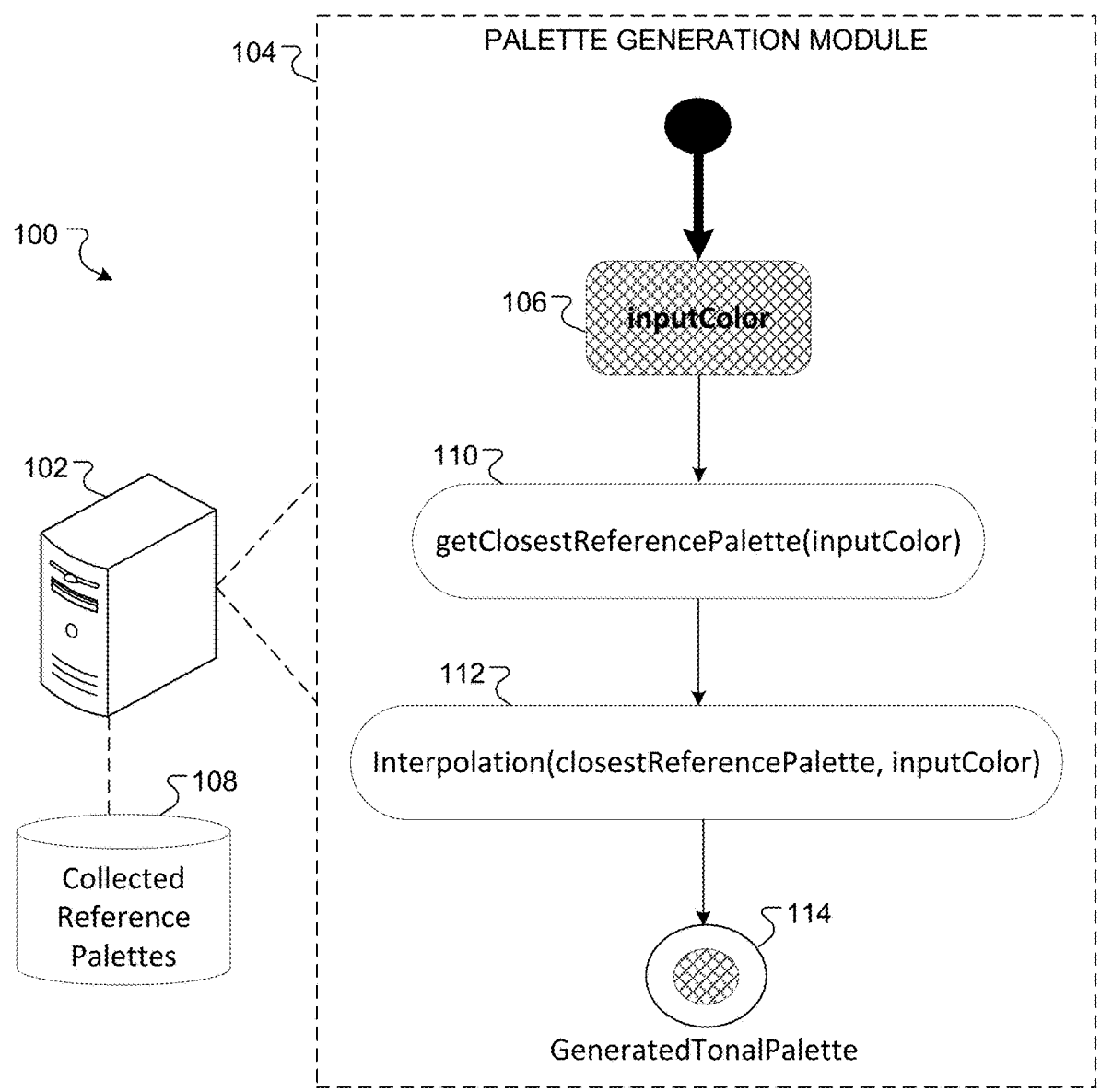
FIG. 1 is a block diagram of an example computing system for generating a tonal palette.

This document describes methods for generating a tonal palette using a particular input color and colors of a reference palette. A computing system uses specific computational processes/rules to generate tonal palettes that are consistent with an example color system represented by different reference palettes. For example, the system uses an input color and sets of curated reference palettes to generate a new color palette that has visual properties that are consistent with the curated properties of a single reference palette. Each reference palette corresponds generally to a particular color (e.g., red, blue, green, etc.) and may include multiple different light and dark tones or shades of the particular color. The new color palette includes a variety of color tones that are similar (e.g., substantially similar) to the input color. The new color palette can also have visual color attributes which are close to, or the same as, color attributes of a particular reference palette.

To the generate a new tonal palette, the system uses the input color to identify a first curated reference palette from among the multiple sets of reference palettes. For example, to identify the first curated reference palette, the system determines mathematical relationships between the input color and each reference palette in the set of curated reference palettes. Based on this determination, the system identifies the first reference palette as having color attributes that are closest to the input color. The identified first reference palette can include a particular color selection (e.g., a color tone/shade) which most closely matches the input color. To select a particular color/color tone, the system computes distances between the input color and each color of the reference palette.

For example, the system may convert the colors of the reference palette to color parameter values for dimensions of a color space and determine the distance values using a mathematical model for the color space. Using the computed distances, the system determines a minimum color distance between the input color and the colors of the identified first reference palette. The system selects a particular color of the first reference palette based on a minimum (or some other specified) computed distance between the input color and the colors of the first palette. The minimum computed distance indicates the particular color selection which most closely matches the input color. The system generates a new tonal palette from the identified reference palette by interpolating the new tonal palette based on the reference palette and the minimum color distance. Note that the reference palette having the minimum computed distance is referred to throughout this document, but the disclosure is not limited to use of the reference tonal palette having a minimum computed distance, as other reference tonal palettes that do not have the minimum computed distance could potentially be used (e.g., if those reference tonal palettes have less than some specified computed distance).

FIG. 1 is a block diagram of an example computing system 100 for generating a tonal palette. System 100 includes a computing server 102 that uses software instructions for accessing, implementing, or executing a palette generation module 104. As indicated by the implementation of FIG. 1, palette generation module 104 can use specific computing rules to generate a variety of color/tonal palettes based on input color 106. For example, module 104 receives an input color value that represents an input color 106 based on user input received at server 102. The user input can indicate an input color 106 selected by a user, where the input color can be any known color selection, such as red, green, or blue.

Computing server 102 is configured to use module 104 to generate various tonal palettes based on input color 106. In some implementations, module 104 is included within server 102 as a sub-system of hardware circuits that includes one or more processor microchips. In general, server 102 can include processors, memory, and data storage devices that collectively form computer systems of server 102. Processors of the computer systems process instructions for execution by server 102, including instructions stored in the memory or on the data storage device to display graphical information for output at a display monitor of system 100.

Execution of the stored instructions can cause one or more of the actions described herein to be performed by server 102 or module 104. In other implementations, multiple processors may be used, as appropriate, along with multiple memories and types of memory. For example, server 102 may be connected with multiple other computing devices, with each device (e.g., a server bank, groups of servers, modules, or a multi-processor system) performing portions of the actions, operations, or logical flows described in this specification.

Repository 108 is an example memory or data storage device of server 102 that is configured to store multiple curated reference palettes that each include a set of colors. Each reference palette in repository 108 can be curated to have color tones and visual properties that may be perceived as harmonious to some users. Reference palettes can have color shades that appear harmonious to some users based on certain curated visual properties. For example, curated reference palettes can be described as "golden" (or "ideal") palettes that are created by human designers to have appealing visual properties. Hence, golden palettes are reference palettes that include color shades arranged by designers to represent harmonious or desirable color schemes. Each reference palette can represent a variety of color shades or tones for a certain principal color. For example, if a selected input color 106 is blue (e.g., navy blue or royal blue), then at least one reference palette of the multiple curated reference palettes can include various shades or tones of the blue input color, i.e., the principal color.

Using the specific computing rules, system 100 identifies a reference palette from among multiple curated reference palettes stored in palette repository 108. To identify the reference palette, system 100 uses module 104 to determine mathematical relationships between the input color and at least a subset of curated reference palettes accessed from palette repository 108. For example, at computing block 110, module 104 identifies and obtains a curated reference palette that is closest in color property to input color 106. To obtain the closest reference palette, module 104 computes distances between input color 106 and each color for each of the reference palettes in the subset of reference palettes.

In some implementations, module 104 uses the CIE Delta E 2000 (CIEDE2000) metric to calculate or compute distance values that define a distance between input color 106 and each reference palette and between input color 106 and each color in a respective reference palette. In general, the CIEDE2000 metric can represent an algorithm for quantifying a measure of change in visual perception of two given colors. Delta E provides a metric for understanding how the human eye perceives color difference. The delta term indicates a change in a variable or function, while the suffix E references the German word Empfindung, which broadly means sensation. Table 1 below indicates a typical scale for Delta E values that range from 0 to 100.

TABLE 1

Delta E Values

| Delta E | Perception |
|---|---|
| <=1.0 | Not perceptible by human eyes. |
| 1-2 | Perceptible through close observation. |
| 2-10 | Perceptible at a glance. |
| 11-49 | Colors are more similar than opposite |
| 100 | Colors are exact opposite |

Referring again to computing block 110, module 104 uses the calculated distance values to get the closest reference palette. For example, in response to performing computations using the CIEDE2000 metric, module 104 may return a discreet numerical distance value for each reference palette in the subset of curated reference palettes. In some implementations, for each reference palette in the subset, module 104 can calculate respective color distance values for each color in the reference palette.

Based on the respective color distance values for each color in the reference palette, module 104 can then compute an overall discrete distance value for the reference palette. Module 104 identifies a particular reference palette as having color attributes or visual properties that are closest to input color 106 (or having a specified level of similarity to the input color). For example, module 104 can get the closest reference palette by identifying a reference palette that has the smallest computed distance (e.g., Delta E distance value less than 1.0) to input color 106 as compared to other reference palettes in the subset.

Using the selected (e.g., closest) reference palette, module 104 determines a minimum color distance between input color 106 and the colors included in the closest reference palette. For example, as indicated above, module 104 can: i) calculate respective sets of color distance values for each color or color shade in the reference palette; ii) compare the respective sets of color distance values for each color shade in the reference palette; and iii) based on this comparison, determine the minimum color distance between input color 106 and each color of the closest reference palette.

Module 104 selects a particular color of the identified reference palette based on the minimum computed distance between input color 106 and each color in the reference palette. Specifically, the minimum computed distance defines a distance between input color 106 and a particular color shade or tone, in the reference palette, that most closely matches input color 106 (or has a minimum level of similarity to the input color). In some implementations, module 104 selects the particular color of the reference palette in response to identifying the closest reference palette using at least the discreet distance values for each reference palette in the subset.

At computing block 112, module 104 generates a new tonal palette 114 from the identified reference palette by interpolating the new tonal palette based on the minimum computed distance used to select the particular color of the reference palette. Interpolating a new tonal palette based on the minimum computed distance is described herein below with reference to FIG. 2. In general, module 104 determines mathematical relationships between the color distance values for the selected color of the reference palette and each respective set of color distance values for the other colors of the reference palette. Module 104 uses result values of the mathematical relationships to interpolate a new tonal palette and to produce a set of colors and color shades included in tonal palette 114.

As described in more detail below, module 104 generates tonal palette 114 using each color of the reference palette and color space values for the selected color shade or tone that most closely matches input color 106. In some implementations, color or tonal palettes generated by module 104 are used by designers to produce graphical user interfaces (GUIs) that are provided for output at a display of a computing device. Module 104 automates the otherwise manual generation of user interface (UI) libraries and UI tools that are used to create multi-colored graphical displays. For example, a user can specify particular brand colors, e.g., input color 106, and module 104 can generate particular sets of tonal palettes 114 that include related colors and tones for use across a variety of UI display components.

Figure 2:
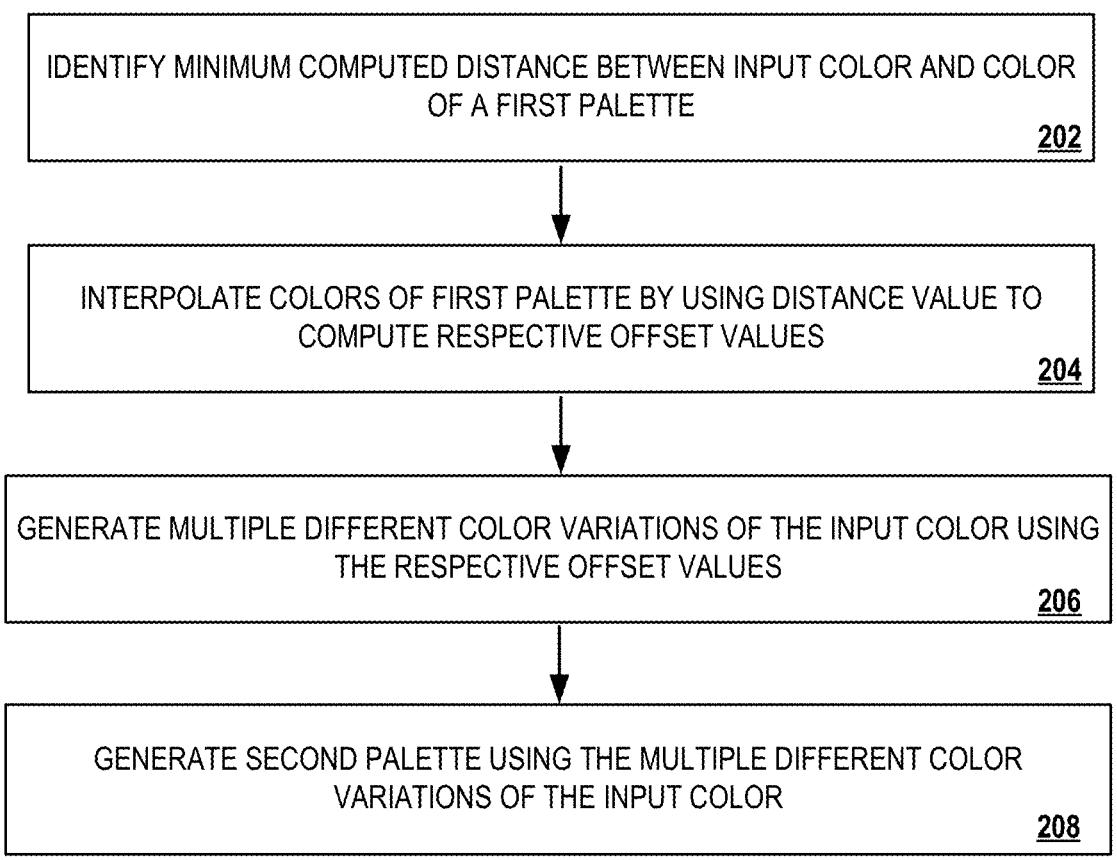
FIG. 2 is a flowchart of an example process for generating a tonal palette.

FIG. 2 is a flowchart of an example process 200 used to generate tonal palette 114. Specifically, process 200 is an example process flow for interpolating a new tonal palette based on the minimum computed distance used to select the particular color of the identified reference palette. Process 200 can be implemented or executed using system 100 described above. So, descriptions of process 200 may reference the above-mentioned computing resources of system 100. In some implementations, described actions of process 200 are enabled by programmed software instructions that are executable by at least one processing device and memory of computing systems described in this document.

Referring now to process 200, at block 202, system 100 determines a minimum computed distance between input color 106 and the particular color of the identified reference palette. An example distance value (or a set of color distance values) can represent the minimum distance between input color 106 and a color shade that most closely matches input color 106 (or has at least a specified level of similarity to the input color). Based on the distance value, module 104 selects a color from the reference palette that has the smallest distance to input color 106 in an example color space.

The color space can be a multi-dimensional color space. Each color shade of the reference palette is represented within the color space by a specific color value for each dimension of the color space. A distance value for each dimension of the color space can form a respective set of color distance values that defines a distance between input color 106 and a color in the reference palette. In some implementations, the color space is a three-dimensional Lab color space, where each letter (L, a, or, b) corresponds a particular dimension of the three dimensions.

In general, the CIE developed the Lab color space as a means of approximating human color perception. A Lab color space can be used to describe mathematically all perceivable colors in the three dimensions, "L" for lightness, "a" for the color opponents green-red, and "b" for the color opponents blue-yellow. For example, the value of L* for a given color can vary between 100 (perfect white) and 0 (perfect black), and gives a measure of the lightness of the color. The value of a* provides a measure of the red-green character of the color, with positive values for red shades and negative values for green. The value of b* provides a measure of the yellow-blue character of the color with positive values for yellow shades and negative for blues. In addition to the Lab color space, various other multi-dimensional color spaces are also within the scope of this specification and can be used in combination with the described computing rules for generating new tonal palettes 114.

In some implementations, before calculating a distance between input color 106 and all colors of a reference palette, system 100 may convert each color of the reference palette so each color can be represented in the Lab color space. For example, system 100 can access repository 108 and convert the colors of a curated reference palette such that each reference palette includes color values that are suitable for representation in the Lab color space. In some implementations, module 104 uses a computing function to obtain the closest reference palette based on computed distances as described above. The function can obtain the closest reference palette by calculating the distances using the converted color values for dimensions of the multi-dimensional Lab color space.

At block 204, system 100 interpolates a new tonal palette based on the identified reference palette and the minimum color distance between input color 106 and the selected color of the identified reference palette. For example, module 104 can interpolate a new tonal by using the minimum distance value to compute a respective offset value for each color in the reference palette. In some implementations, module 104 computes the respective offset values for each color of the reference palette by performing one or more vector operations. The respective offset values can be vector quantities that are computed based on the minimum distance amount between input color 106 and the selected color of the reference palette. The offset values/quantities can be computed for a given dimension of the Lab color space and each offset value is used to generate a particular color of tonal palette 114.

The interpolation of a new tonal palette can be a vector interpolation computed as a vector operation in the multi-dimensional Lab color space. The vector interpolation can be a linear interpolation based on a lightest to a darkest color in the identified reference palette or a match interpolation, where each color in a new tonal palette is interpolated from a corresponding color in the reference palette and the minimum computed color distance. Module 104 can be configured to perform the vector interpolation such that input color 106 is included in a new tonal palette. In some implementations, interpolating the new tonal palette includes: i) computing a match interpolation using color values of the reference palette, ii) computing a linear interpolation using color values of the reference palette, iii) computing a bezier interpolation using color values of the reference palette, or iv) using combinations of these interpolation methods.

At block 206 of process 200, system 100 generates multiple different color variations of input color 106 by applying a respective offset quantity to each value in a set of color values for the colors in the reference palette. In some implementations, module 104 applies the offset quantity for a particular color value as a vector operation in a particular dimension of the multi-dimensional color space. As shown at FIG. 3A, color values for dimensions of the Lab color space are represented using three separate parameter/color values for each of the three dimensions, e.g., L: 0.19, a: 0.66, b: 0.61.

In some implementations, performing match interpolation includes applying an offset across all colors of a reference palette such that colors of the offset reference palette matches, or substantially matches, color properties of input color 106. For example, if the darkest color in the reference palette was the selected color that most closely matched input color 106, then interpolating the new tonal palette would involve adjusting the L-parameter of the LAB color space by adding an example offset amount to all of the colors across the reference palette to generate a new tonal palette. At block 208, module 104 generates tonal palette 114 using the multiple different color variations of input color 106 that are produced using the offset quantities.

Figure 3A:
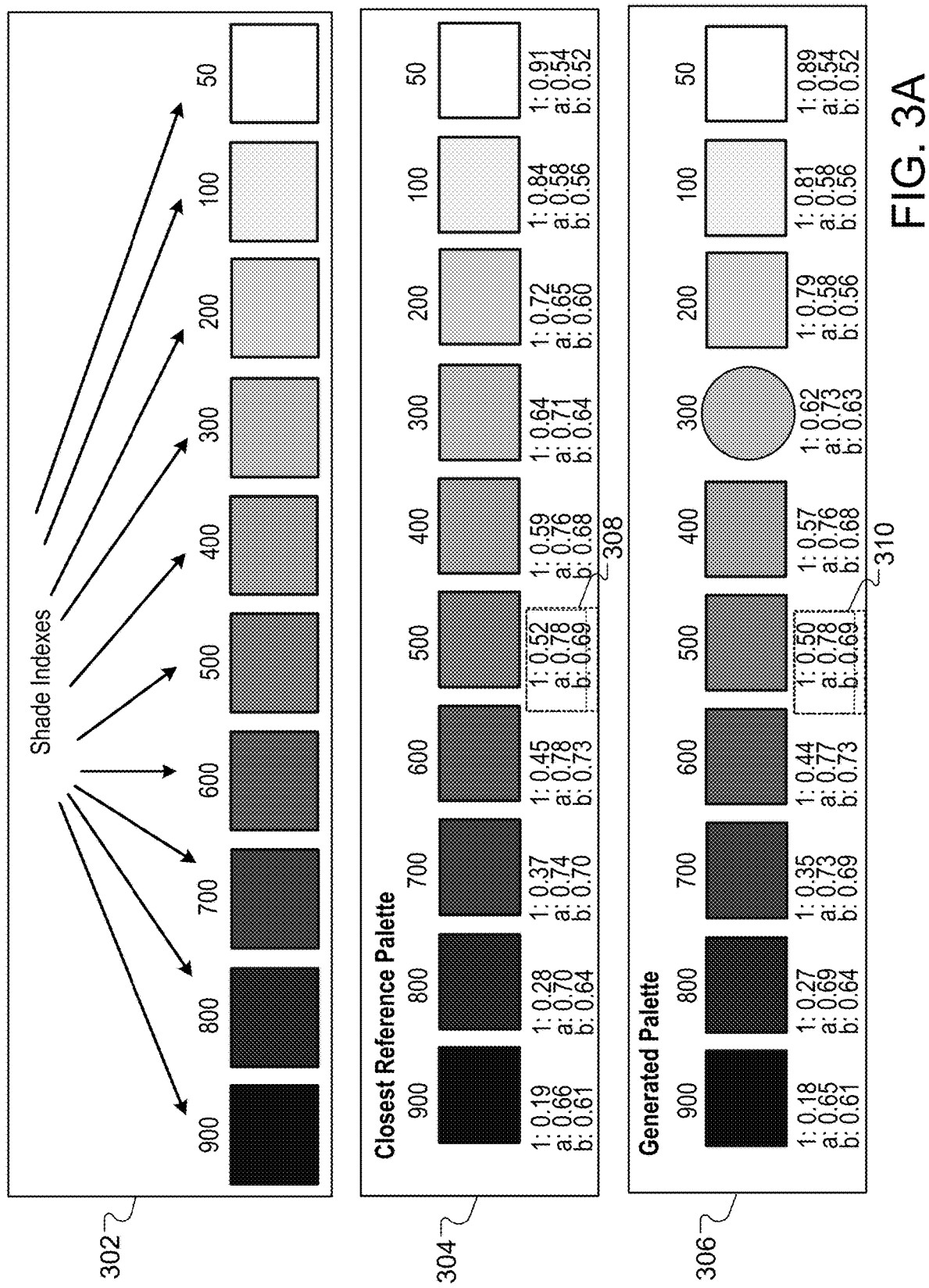
FIG. 3A shows color shade information for generating a tonal palette.

FIG. 3A shows color shade information for generating tonal palette 114. As indicated above, module 104 can use a computing function to obtain the closest reference palette. Module 104 selects, from the closest reference palette, a particular color that most closely matches input color 106. The computing function can also generate an example color shade index 302 based on the selected color that most closely matches input color 106. Shade index 302 represents a variety color shades for the selected color that is closest in distance to input color 106. As shown at FIG. 3A, shade index 302 includes multiple color shade identifiers and respective descriptions and notes for each color shade identifier in the index 302. Table 2 below includes details about the respective descriptions and notes for each color shade identifier in shade index 302.

TABLE 2

Color Shade Identifiers

| Color Name/Identifier | Color Description | Color Note |
|---|---|---|
| 900 | Darkest color from the generated palette | — |
| 800 | Lighter version of 900 | Darker than 700 |
| 700 | Lighter version of 800 | Darker than 600 |
| 600 | Lighter version of 700 | Darker than 500 |
| 500 | Lighter version of 600 | Darker than 400 |
| 400 | Lighter version of 500 | Darker than 300 |
| 300 | Lighter version of 400 | Darker than 200 |
| 200 | Lighter version of 300 | Darker than 100 |
| 100 | Lighter version of 200 | Darker than 50 |
| 50 | Lightest color from the generated palette | — |

When the computing function obtains the closest reference palette, the function can also return an example object/data structure 304 that identifies the closest reference palette. In some implementations, module 104 is configured to produce an example object/data structure 306 identifying a new tonal palette 114 that is generated based on the interpolation process described above. As shown at FIG. 3A, the generated tonal palette identified by object 306 includes Lab parameter/color space values 310 (L: 0.50, a: 0.78, b: 0.69). Color space values 310 generally, or substantially, match the Lab parameter/color space values 308 (L: 0.52, a: 0.78, b: 0.69) for the closest reference palette identified by object 304.

FIG. 3B shows a source code routine for an example coded function 312. Function 312 can be used by module 104 to identify and obtain a reference palette having colors that most closely match input color 106. The reference palette is obtained from among the multiple curated reference palettes (e.g., "golden palettes") stored at data repository 108. For example, module 104 can use function 312 to: i) traverse each reference palette stored at data repository 108, and ii) traverse each color shade in each reference palette stored at data repository 108. These traversal operations enable module 104 to analyze and compare each reference palette and the colors in each reference palette to input color 106. The comparison can include determining color space distances between input color 106 and colors in the reference palettes. Based on this analysis and comparison, function 312 returns the closest reference palette that can be used to generate a new tonal palette. In some implementations, coded operations of function 312 represent at least a subset of the specific computational rules that are described herein for generating new tonal palettes.

Figure 4:
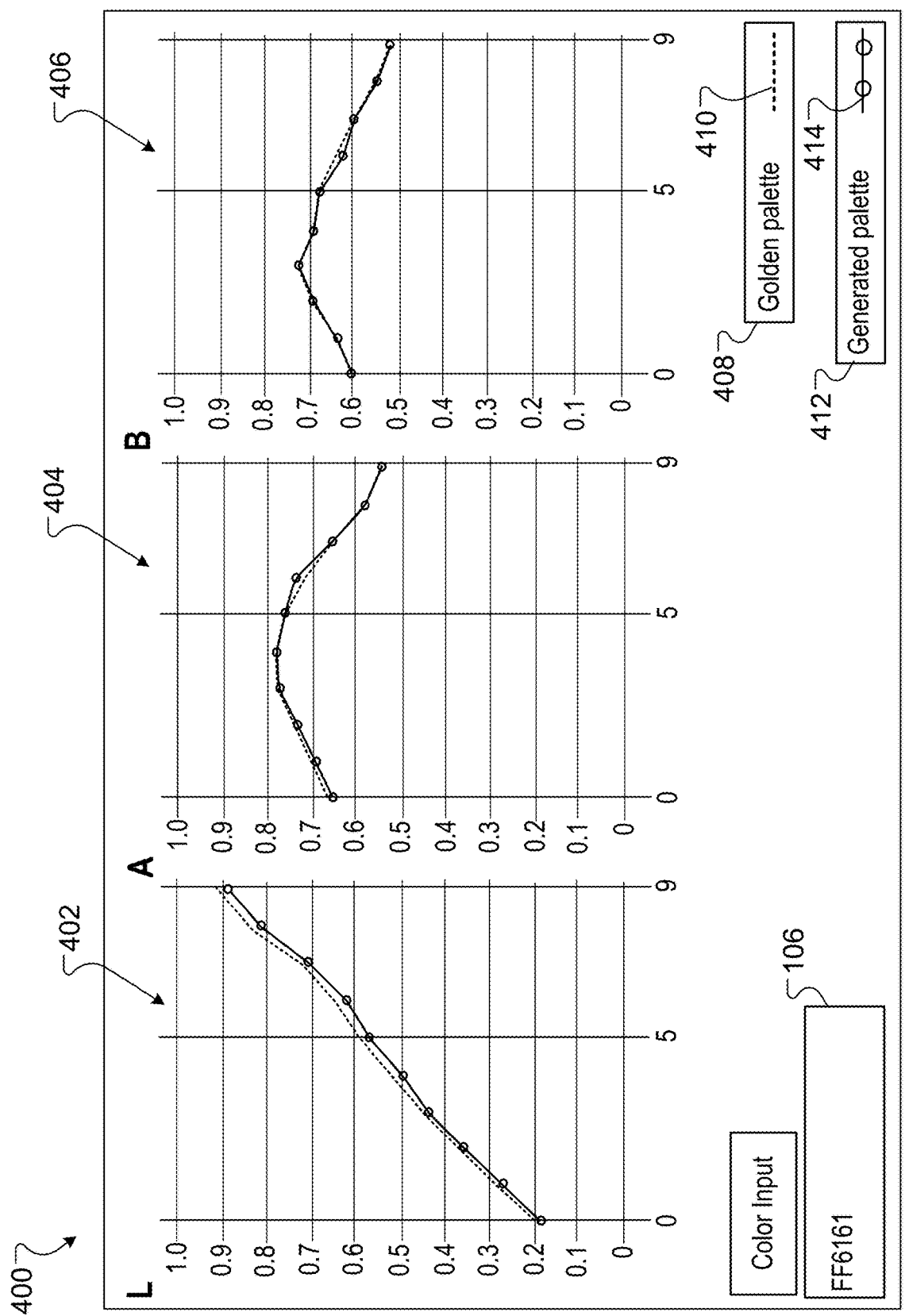
FIG. 4 shows graphical data for a multi-dimensional color space used to generate a tonal palette.

FIG. 4 shows a graph 400 that includes graphical data for an example three dimensional color space. Graph 400 includes graphical data for a first color space dimension 402, a second color space dimension 404, and a third color space dimension 406. In some implementations, the color space is a Lab color space for representing values for colors of at least one reference palette and an example tonal palette 114. Hence, each of dimensions 402, 404, 406 can represent a respective dimension (L, A, or B) of a Lab color space. Graph 400 further includes an example hexadecimal input value ("FF6161") that represents input color 106 and respective graph legends 408 and 412.

In some implementations, each color space dimension L, A and B, can be represented using a two-dimensional (2D) graph. The X-axis of the 2D graph can indicate colors in a color palette, where the left most value ("0") of the X-axis represents the darkest color in the palette and the right most value ("9") represents the brightest color in the palette. The Y-axis of the 2D graph for the L color space dimension (402) indicates parameter values for L, the Y-axis of the 2D graph for the A color space dimension (404) indicates parameter values for A, and the Y-axis of the 2D graph for the B color space dimension (406) indicates parameter values for B. For each dimension, a particular color along the X-axis of the 2D graph can indicate a respective value for the selected color that is closest to input color 106.

Legend 408 identifies a first line 410 that connects multiple data points, where each of the multiple data points can represent a color value for a respective color of an identified reference palette. Likewise, legend 412 identifies a second line 414 that connects multiple data points, where each of the multiple data points can represent a color value for a respective color of a newly generated tonal palette 114. Each of dimensions 402, 404, 406 can include a first line 410 and a second line 414. Additionally, for each of dimensions 402, 404, and 406, line 410 and line 414 may generally indicate a relationship between colors of a reference palette and a generated palette 114. For example, in each color space dimension of graph 400, lines 410 and 414 can provide a visual representation of an amount by which color values for the generated palette are offset from color values for the golden/reference palette.

For clarification, as used herein, the term "golden palette" does not refer to a golden color, but rather represents a standard for indicating approved reference palettes. For example, approved reference palettes can be palettes that have been determined to meet at least a threshold standard for indicating a certain visual appeal of the palette. In some instances, golden palettes can alternatively be referred to also as "ideal palettes" or "model" palettes.

Figure 5:
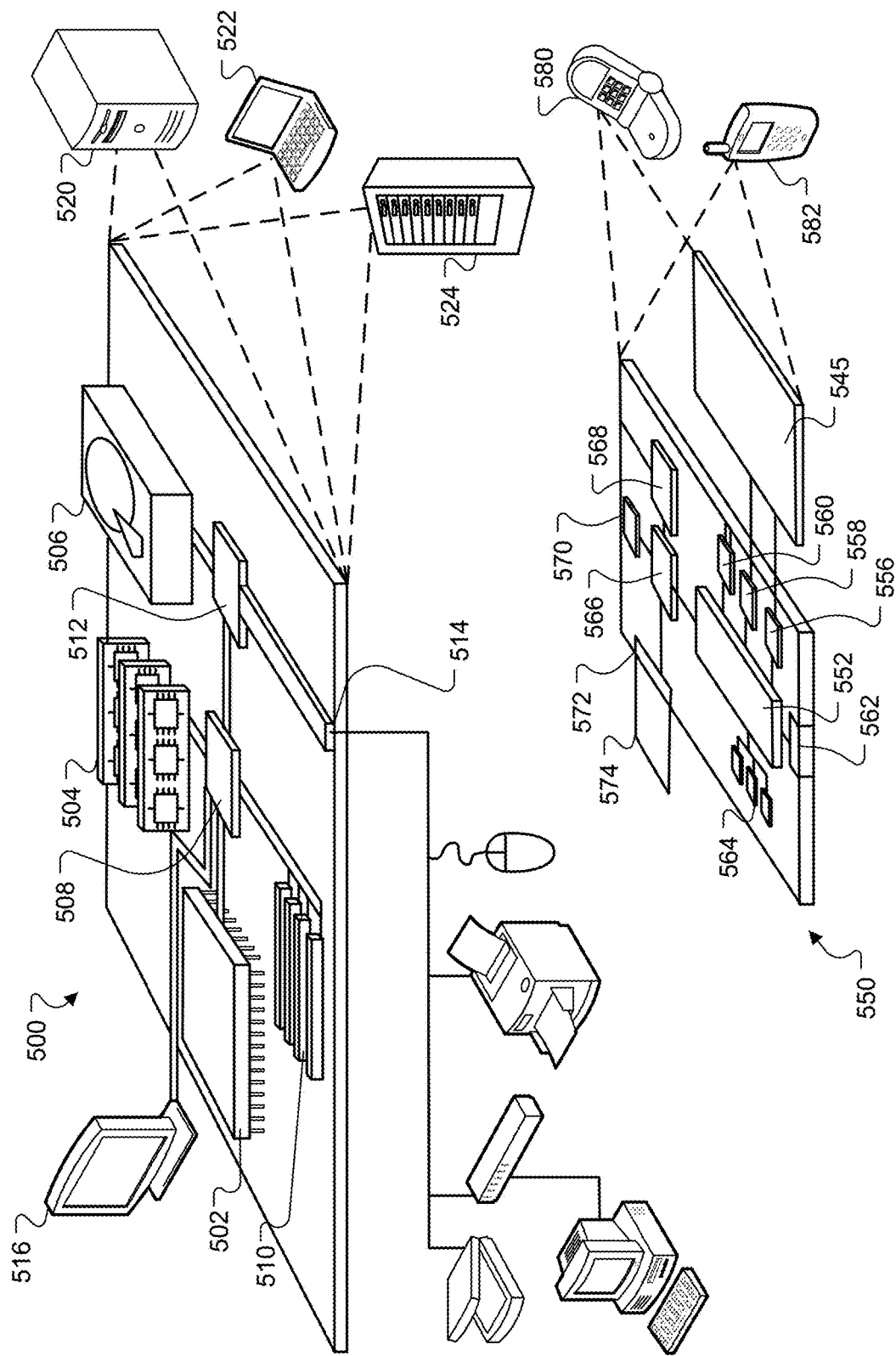
FIG. 5 is a block diagram of a computing system that can be used in connection with methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
receiving, by a palette generation module of a computing system, an input color value that represents an input color;
identifying, by the palette generation module, a first palette from a plurality of reference palettes that each include a set of colors, the first palette being identified using the input color;
in response to identifying the first palette, selecting, by the palette generation module, a particular color of the first palette based on a minimum computed distance between the input color and the colors of the first palette; and
generating, by the palette generation module and from the first palette, a second palette that includes a second set of colors, wherein the second palette is generated by interpolating the first palette based on the minimum computed distance used to select the particular color of the first palette, wherein generating the second palette comprises,
  determining the minimum computed distance as a distance value between the input color and the particular color of the first palette,
  interpolating colors of the first palette by using the distance value to compute a respective offset value for each color of the first palette,
  generating a plurality of different color variations of the input color by applying the respective offset value to a color value for each color of the first palette, and
  generating the second palette using the plurality of different color variations of the input color, where the plurality of different color variations corresponds to the second set of colors.

2. The method of claim 1, wherein each color of the first palette is represented by at least one parameter for a dimension of a multi-dimensional LAB color space.

3. The method of claim 1, wherein selecting the particular color of the first palette comprises generating a shade index comprising color shade variations for the particular color of the first palette.

4. A computer-implemented method, comprising:
receiving, by a palette generation module of a computing system, an input color value that represents an input color;
identifying, by the palette generation module, a first palette from a plurality of reference palettes that each include a set of colors, the first palette being identified using the input color;
in response to identifying the first palette, selecting, by the palette generation module, a particular color of the first palette based on a minimum computed distance between the input color and the colors of the first palette; and
generating, by the palette generation module and from the first palette, a second palette that includes a second set of colors, wherein the second palette is generated by interpolating the first palette based on the minimum computed distance used to select the particular color of the first palette, wherein generating the second palette comprises,
computing an interpolation of the first color palette as a vector operation for each dimension of the multi-dimensional LAB color space, and
generating the second palette based on the computed interpolation.

5. The method of claim 4, wherein computing the interpolation of the first color palette comprises computing a match interpolation of the first color palette.

6. The method of claim 4, wherein computing the interpolation of the first color palette comprises computing a linear interpolation of the first color palette.

7. A computer-implemented method, comprising:
receiving, by a palette generation module of a computing system, an input color value that represents an input color;
identifying, by the palette generation module, a first palette from a plurality of reference palettes that each include a set of colors, the first palette being identified using the input color;
in response to identifying the first palette, selecting, by the palette generation module, a particular color of the first palette based on a minimum computed distance between the input color and the colors of the first palette; and
generating, by the palette generation module and from the first palette, a second palette that includes a second set of colors, wherein the second palette is generated by interpolating the first palette based on the minimum computed distance used to select the particular color of the first palette, wherein identifying the first palette comprises,
computing, for a LAB color space, a distance from the input color to each color included in each of the plurality of reference palettes,
based on the computed distance, determining a minimum distance from the input color to each of the plurality of reference palettes, and
using the minimum distance, identifying the first palette from the plurality of reference palettes as a palette that is closest to the input color.

8. The method of claim 7, wherein the distance from the input color to each color included in each of the plurality of reference palettes is computed based on a CIEDE2000 metric.

9. A computing system comprising:
one or more processing devices; and
one or more non-transitory machine-readable storage devices for storing instructions that are executable by the one or more processing devices to cause performance of operations comprising:
receiving, by a palette generation module of a computing system, an input color value that represents an input color;
identifying, by the palette generation module, a first palette from a plurality of reference palettes that each include a set of colors, the first palette being identified using the input color;
in response to identifying the first palette, selecting, by the palette generation module, a particular color of the first palette based on a minimum computed distance between the input color and the colors of the first palette; and
generating, by the palette generation module and from the first palette, a second palette that includes a second set of colors, wherein the second palette is generated by interpolating the first color palette based on the minimum computed distance used to select the particular color of the first palette, wherein generating the second palette comprises,
determining the minimum computed distance as a distance value between the input color and the particular color of the first palette,
interpolating other colors of the first palette by using the distance value to compute a respective offset value for each of the other colors of the first palette,
generating a plurality of different color variations of the input color by applying the respective offset value to a color value for each of the other colors of the first palette, and
generating the second palette using the plurality of different color variations of the input color, where the plurality of different color variations corresponds to the second set of colors.

10. The computing system of claim 9, wherein each color of the first palette is represented by at least one parameter for a dimension of a multi-dimensional LAB color space.

11. The computing system of claim 9, wherein selecting the particular color of the first palette comprises generating a shade index comprising color shade variations for the particular color of the first palette.

12. A computing system, comprising:
one or more processing devices; and
one or more non-transitory machine-readable storage devices for storing instructions that are executable by the one or more processing devices to cause performance of operations comprising:
receiving, by a palette generation module of a computing system, an input color value that represents an input color;
identifying, by the palette generation module, a first palette from a plurality of reference palettes that each include a set of colors, the first palette being identified using the input color;
in response to identifying the first palette, selecting, by the palette generation module, a particular color of the first palette based on a minimum computed distance between the input color and the colors of the first palette; and
generating, by the palette generation module and from the first palette, a second palette that includes a second set of colors, wherein the second palette is generated by interpolating the first color palette based on the minimum computed distance used to select the particular color of the first palette, wherein generating the second palette comprises,
computing an interpolation of the first color palette as a vector operation for each dimension of the multi-dimensional LAB color space, and
generating the second palette based on the computed interpolation.

13. The computing system of claim 12, wherein computing the interpolation of the first color palette comprises computing a match interpolation of the first color palette.

14. The computing system of claim 12, wherein computing the interpolation of the first color palette comprises computing a linear interpolation of the first color palette.

15. A computing system, comprising:
one or more processing devices; and one or more non-transitory machine-readable storage devices for storing instructions that are executable by the one or more processing devices to cause performance of operations comprising:
  receiving, by a palette generation module of a computing system, an input color value that represents an input color;
  identifying, by the palette generation module, a first palette from a plurality of reference palettes that each include a set of colors, the first palette being identified using the input color;
  in response to identifying the first palette, selecting, by the palette generation module, a particular color of the first palette based on a minimum computed distance between the input color and the colors of the first palette; and
  generating, by the palette generation module and from the first palette, a second palette that includes a second set of colors, wherein the second palette is generated by interpolating the first color palette based on the minimum computed distance used to select the particular color of the first palette, wherein identifying the first palette comprises,
    computing, for a LAB color space, a distance from the input color to each color included in each of the plurality of reference palettes,
    based on the computed distance, determining a minimum distance from the input color to each of the plurality of reference palettes, and
    using the minimum distance, identifying the first palette from the plurality of reference palettes as a palette that is closest to the input color.

16. The computing system of claim 15, wherein the distance from the input color to each color included in each of the plurality of reference palettes is computed based on a CIEDE2000 metric.

17. One or more non-transitory machine-readable storage devices for storing instructions that are executable by one or more processing devices to cause performance of operations comprising:
  receiving, by a palette generation module of a computing system, an input color value that represents an input color;
  identifying, by the palette generation module, a first palette from a plurality of reference palettes that each include a set of colors, the first palette being identified using the input color;
  in response to identifying the first palette, selecting, by the palette generation module, a particular color of the first palette based on a minimum computed distance between the input color and the colors of the first palette; and
  generating, by the palette generation module and from the first palette, a second palette that includes a second set of colors, wherein the second palette is generated by interpolating the first color palette based on the minimum computed distance used to select the particular color of the first palette, wherein generating the second palette comprises,
    determining the minimum computed distance as a distance value between the input color and the particular color of the first palette,
    interpolating other colors of the first palette by using the distance value to compute a respective offset value for each of the other colors of the first palette,
    generating a plurality of different color variations of the input color by applying the respective offset value to a color value for each of the other colors of the first palette, and
    generating the second palette using the plurality of different color variations of the input color, where the plurality of different color variations corresponds to the second set of colors.

18. A method for generating a tonal palette including a plurality of colors, the method comprising the steps:
  obtaining an input color;
  determining from a plurality of predetermined reference palettes a first reference palette closest to the input color;
  determining a minimum color distance between the input color and the colors included in the first reference palette, wherein colors for comparison are converted to LAB color space before determining color distance; and
  generating a new tonal palette from the first reference palette by interpolating the first reference palette based on the minimum color distance, wherein the interpolation of the first reference palette is computed as a vector operation in LAB color space.

19. The method of claim 18, wherein the closest reference palette is determined from the plurality of predetermined reference palettes as a reference palette that includes a color with minimum color distance to the input color.

20. The method of claim 19, wherein color distance is determined based on CIEDE2000 metric.

21. The method of claim 18, wherein the interpolation is a linear interpolation based on a lightest to a darkest color in the first reference palette.

22. The method of claim 18, wherein the interpolation is a match interpolation, wherein each color in the new tonal palette is interpolated from a corresponding color in the first reference palette and the minimum color distance.

23. The method of claim 18, wherein the interpolation is such that the input color is included in the new tonal palette.

* * * * *